Aug. 10, 1965  R. S. MADEUX  3,199,722
ORIENTING AND FEEDING APPARATUS
Filed Jan. 23, 1959  5 Sheets-Sheet 1

Aug. 10, 1965  R. S. MADEUX  3,199,722
ORIENTING AND FEEDING APPARATUS
Filed Jan. 23, 1959  5 Sheets-Sheet 3

United States Patent Office 3,199,722
Patented Aug. 10, 1965

3,199,722
ORIENTING AND FEEDING APPARATUS
Robert S. Madeux, Watertown, Conn., assignor to The Bristol Company, Waterbury, Conn., a corporation of Connecticut
Filed Jan. 23, 1959, Ser. No. 788,543
3 Claims. (Cl. 221—9)

This invention relates to improvements in automatic feeding mechanisms of the class in which regular cylindrical objects, as, for example, headless machine screws, are placed in uniform orientation in preparation for use. More specifically, it relates to orienting means by which the orientation of successive cylindrical objects being fed, which are chiefly distinguishable by a symmetrically-disposed raised or depressed area in one end substantially greater in height or depth, respectively, than any similar characteristic in the other end, is accomplished by a feeler mechanism sensitive to the said characteristic and operative to reverse the end-to-end position of those objects not in the preferred orientation.

A common use of such a device is, for example, in conjunction with an automatic screw driver. In conventional equipment of this class, the common types of headed machine screws are placed in a tilted rotating hopper from which they are collected by some selecting means and fed by gravity along a track or tube to an escapement device whereby they are released, one by one, to mechanical fingers by which each screw in turn is gripped and held. In this position, the screw is engaged by the screw driver and driven into the workpiece. In the case of headed screws, the problem of proper orientation of screws in the feed line is commonly solved by providing means in the supply hopper so that they fall first into aligning slots, and then, as the hopper rotates, they drop from said aligning slots into a track where they are suspended by their heads. Those falling upside down are not engaged by the track and fall back into the hopper to be re-cycled. The others slide down the feed line to the screw driver. In the case of many types of hollow-head set-screws, however, there is no such regular external characteristic by which they may be conveniently sorted.

In my co-pending U.S. patent application Serial No. 632,440, filed January 4, 1957, now Patent No. 2,997,-202, there is disclosed apparatus for sorting and feeding headless objects. The present invention is an improvement upon the apparatus disclosed in the aforementioned application and is particularly adapted to handle very small objects of the character described and especially such objects whose dimensions of length and diameter are approximately equal.

In the case of hollow-headed screws of very small size and approximately square profile, special problems arise due to the necessity for exact registration of inter-related moving parts, stricter dimensional tolerance requirements, effects of friction and the like which impose serious restrictions on high speed mechanical orienting devices of this class. The present invention addresses itself to the solution of such problems.

It is therefore an object of this invention to provide a feed mechanism whereby small cylindrical objects whose length and diameter are approximately equal and each characterized by a predominant characteristic of one end may be automatically and singly taken from a heterogeneously oriented supply and delivered in a uniform orientation.

It is a further object to provide an orienting mechanism for a succession of small, regular, cylindrical objects whose length and diameter are approximately equal and which are characterized by a predominant characteristic at one end, in which, in a line of said objects heterogeneously disposed, a feeler mechanism determines the presence or absence of said characteristic in each successive object and passes each object along unchanged or reverses it, depending on the orientation desired with respect to said characteristic, the mechanism being arranged to "remember" the position of the reversing means as left by the object next preceding.

Another object is to provide a high-speed orienting mechanism for small, cylindrical objects of approximately square profile and having characteristically different ends, which will operate upon a feed supply of said objects heterogeneously arranged with respect to their ends in a manner to pass along to a discharge line 100 percent of the objects fed.

A still further object is to provide an automatic screw-driver mechanism in which the driving-stroke operation of the screw-driver spindle (to drive a screw into a workpiece) simultaneously initiates a cycle of operations including, successively, restoring, if necessary, the mechanism from previous orienting operations, accepting a next screw from a feed line, and presenting it in a position opposite to a feeler mechanism; in the released-stroke operation of the screw driver, the cycle of operations is completed by momentary descent of the feeler mechanism, whence the orientation position of the retained screw is determined, and, dependent on the finding of said feeler, the screw is transmitted to the work position or reversed end-for-end and transmitted to this position.

Other objects and advantages will be apparent from the following detailed description in conjunction with the accompanying drawings, wherein.

Figure 1:
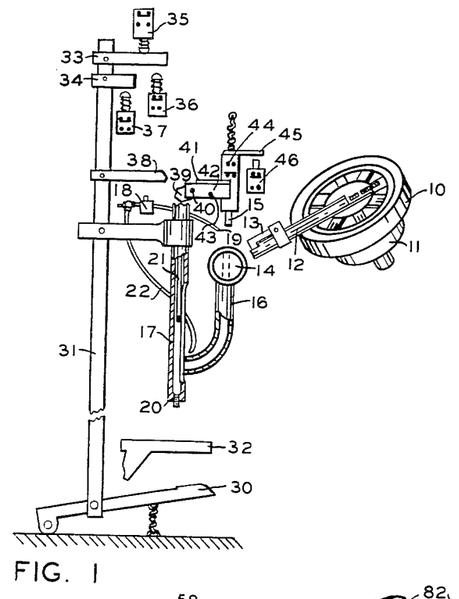
FIG. 1 shows schematically, by way of example, essential components of the operating mechanism of an automatic screw driver together with cycle-establishing elements according to my invention.

Referring now to FIG. 1, a rotating hopper 10 driven by motor 11 feeds socket-type headless screws in random orientation into tube 12, through which they fall by gravity until stopped by gate member 13. Here, they are fed, one by one, into orienting turret 14. For each screw, a feeler mechanism 15 operates to sense the conformation of the end presented for examination. The turret 14 and its associated mechanism is shown and described in detail hereinafter. When orientation of a screw has been determined and proper orientation effected, the screw is impelled by an air stream from tube 19, controlled by solenoid-operated valve 18, into tube 16 and passes through tube 16 into the hollow finger 17. A constant stream of air through tube 22 directed into the finger 17 assists in placing and holding the screw in holder 20 in readiness for engagement by the screw driver bit 21. The finger 17 is moved upward and downward past the fixed feed tube 16 through the action of the foot pedal 30 and operating rod 31, and makes registration with a workpiece (not shown) on platform 32. Also, under control of foot pedal 30 and by parallel mechanism, well known and forming no part of this invention and, hence, not shown here, is rotating means attached to wrench or screw driver 21 within finger 17. Simultaneously with lowering of finger 17, said wrench 21, rotated by a power source not shown, is also lowered to make engagement with said screw, driving it into the said workpiece. The finger 17, wrench 21, pedal 30, and operating rod 31 are parts of well known and conventional power screw-driving machines, which will be hereinafter further illustrated. The motor-driven hopper 10 may also be of a type well known in power screw-driving machines.

The cycle of component operations which results in the feeding of the screws in proper orientation for use by the screw driver is conveniently affected in the illustrated example by the foot pedal 30 which also actuates the screwdriver finger. The operator may readily bring a workpiece into screw-receiving position on the platform 32 during the upstroke of the pedal 30, or at any time before depressing the pedal sufficiently to drive the screw into the workpiece. Obviously, however, a variety of other means could be employed for operating the screw driver, and other means for timing cyclic operations of the feeding and orienting means could also be used alternatively, depending on the use to which this invention is applied.

As above noted, the spring-opposed foot pedal 30 engages an operating rod 31 arranged for a limited vertical motion, which motion is primarily intended to move the finger 17 and the screw driver, or socket wrench 21 within finger 17, to and away from its operating position. In addition, however, attached to said rod are switch-operating arms 33 and 34, through which, in cooperation with electrical double-pole, double-throw switches 35, 36, and 37, certain sequential switching operations are performed. As described in more detail hereinafter, on the down stroke rod 31 operates the switches in the following sequence, first, switch 35; second, switch 36; and third, switch 37. The reverse of this sequence takes place on the up stroke of the rod 31. A mechanical tripping mechanism, which, as shown, may consist of a rigid tripper 38 mounted on the operating rod 31, is further provided in these sequential operations. At the proper time, the tripper 38 is brought into engagement with mating finger 39 which forms part of a unidirectional lever system, pivoted about point 40. In counterclockwise motion, finger 39 moves against the force of a flat restraining spring 41 but transmits no motion to lever 42; in clockwise motion, finger 39 engages pin 43 and moves lever 42 clockwise about said point 40. Attached to said lever 42 is sensing switch 44 and, through a secondary arm 45, an auxiliary switch 46 whose functions will be described hereinafter. The effect, therefore, of this assembly, due to the yieldably joint, is such that, as tripper 38 moves downward, mating finger 39 trips but transmits no motion to member 42. In the opposite direction, the upward tripping motion of finger 38 moves the now rigid lever system including 39, 42, and 44 in such a direction that a sensing pin 15 associated with switch 44 makes a momentary exploratory contact with a screw held in the orienting turret in a manner yet to be described. Switch 44 is a double-pole single-throw switch with normally open contacts directly operated by the sensing pin 15. The subsidiary switch 46 is a double-pole single-throw switch, whose contacts are normally closed and which is operated by the first downward movement of the sensing mechanism, remaining in the operated state until near the end of the sensing operation.

Figure 2:
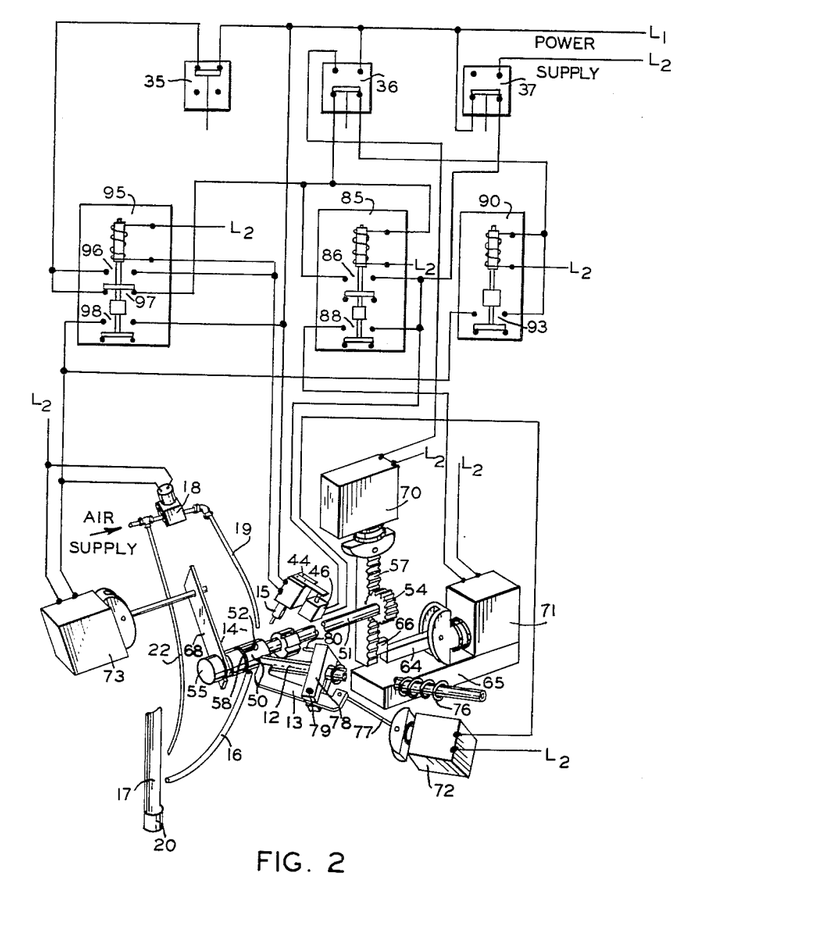
FIG. 2 shows schematically the disposition of operating elements and electrical connections therebetween to accomplish the purposes of the invention.
Figures 3, 4:
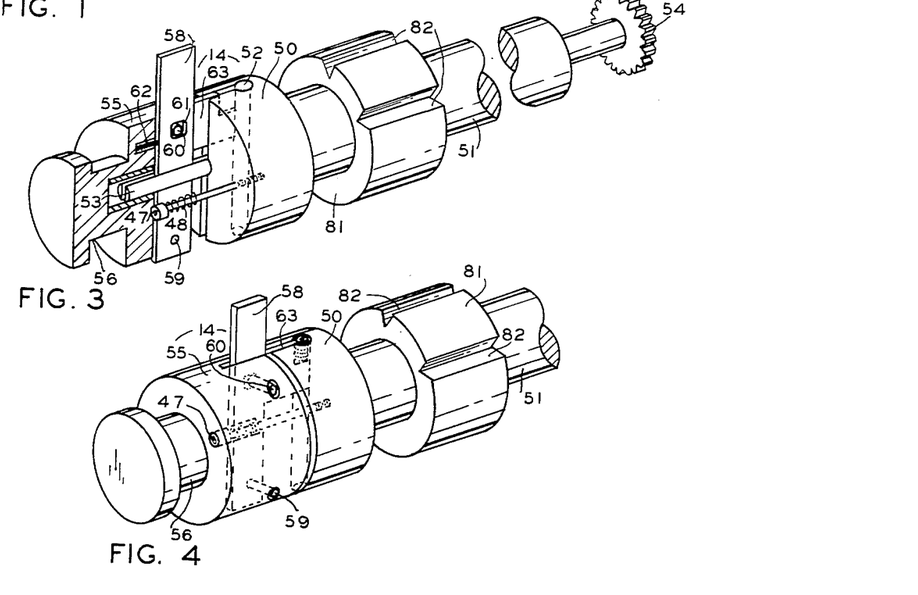
FIG. 3 shows in detail, partly in section, the orienting head with gate member open.
FIG. 4 shows the orienting head of FIG. 3 with gate member closed.

An orienting mechanism adapted for operation in accordance with the principle of my invention is shown in FIGS. 2, 3 and 4 and is constructed as follows:

Orienting turret 14 (as shown in FIGS. 3 and 4) comprises a cylindrical body member 50, one end of which is attached to shaft 51. At its other end, the member 50 is provided with a transverse hole 52 slotted on one side, and terminates in a shaft extension 53 of reduced diameter through which the above-mentioned slot is extended. A separable member 55 is slidably fitted on said shaft extension 53 and is provided at its outer end with a hub arbor section 56 for operations presently to be described. At its end juxtaposed to the slotted end of the member 50, the separable member 55 is also slotted transversely, and, in this slot, is mounted gate member 58. This gate is pivoted about pin 59 inserted in the side of the separable section. A second pin 60 engages an elongated hole 61 in the gate 58 and determines the limits of motion of the gate. A compression spring 62 located in a recess in the member 55 biases the gate 58 toward the member 50. The members 50 and 55 are interconnected by screws 47 inserted through clearance holes in the member 55 and threaded into the member 50, springs 48 being held in compression on the screws 47 between the head of the screw and the bottom of a recess in the member 55 to bias the members 50 and 55 into contact with each other. Thus, the two halves of the turret and the gate 58 shall be normally closed. Arm 63 of the gate member 58 is notched at its outer end, the vertical dimension of the notch being approximately the length of the screws being sorted and the horizontal dimension of the notch being somewhat less than the diameter.

When assembled, arm 63 of gate 58 fits into the slot in member 50 and the extended shaft 53. The orienting turret 14, comprising member 50 keyed by gate 58 to separable member 55, is capable of partial rotation about the axis of the shaft 51. This rotary motion is imparted to the turret by the spur gear 54 fixed to the outer end of the shaft and meshing with rack 57 attached at one of its ends to the armature of solenoid 70. At its opposite end the rack is provided with a detent or lug 66 which may rest against stop 64, or, if stop 64 is withdrawn by action of solenoid 71 to which it is attached, the rack will rest on bed-plate 65. By this means, it may be seen that the turret 14 and, in particular, the screw-receiving hole 52 which it bears, may assume three positions: the first, when the solenoid 70 is energized and the armature is in the wholly withdrawn position; the second, with solenoid 70 unenergized and solenoid 71 also unenergized when detent 66 rests against stop 64; and the third, with solenoid 70 unenergized and solenoid 71 energized, whence the rack 57 rests against bed-plate 65. Thus, the receiving aperture is movable to three positions, the first position opposite the end of the feed tube 12; second, to a point opposite the sensing pin 15 of the sensing switch 44 (about 30° from said first position); and third, 180° from the second position to a position opposite the discharge tube 16.

In FIGS. 2 and 3, the turret assembly 14 is illustrated with the separable member 55 withdrawn from the body member 50 and gate 58 is fully open, that is, with the transverse hole 52 unobstructed by the notched arm 63. In FIG. 4, the parts 50 and 55 are shown in close engagement. It will be seen, in this position the spring-loaded notched gate holds the individual screw positively until the member 55 and gate 58 are withdrawn.

The separable member 55 is engaged at its hub or arbor portion 56 by the forked link 68 (FIG. 2) attached to the armature of solenoid 73; whereby, upon energization of the solenoid, the member 55 is retracted or separated from the member 50 as shown in FIG. 3. When the solenoid 73 is deenergized, the member 55 is restored to its closed position (shown in FIG. 4) by springs 48. As previously noted, the gate member 58, between the members 59 and 55, is movable in the slot in the face of member 50 mating with the slot across the diameter of the member, and through a range of travel sufficient to include at least partial insertion of the gate 58 into the hole 52. Thus, in its closed position, the separable member 55 acts through the arm 63 to form a gate in the hole 52 to hold a screw; when withdrawn or opened, it allows the screw to fall through the hole.

The feed tube 12 is terminated by gate or escapement member 13. This tube is slidably movable through a short distance from its position shown in FIG. 1 to a position wherein it makes contact with turret 14 and it is normally urged to this latter position by the action of compressed spring 76. Reaction of the tube is effected through the action of the solenoid 72 which first exerts a force transmitted by link 77 to the gate member 13 in a crank-like motion about pivot 79 on the tube-clamp 78 thus causing the gate end to enter the tube and bear upon the screw therein and, thereafter, to retract the tube. In effect, therefore, the force to withdraw the tube acts first to clamp the gate member 13 on the screw if present at the end of the feed tube and thereafter to retract the tube. When the tube is released, the feed tube moves forward under action of spring 76 but the gate will remain closed until positively deflected by means to be described hereinafter.

The movements of the feed tube 12 are used to lock the orienting turret 14 in its various positions. This is effected by a pin 80 attached to the tube clamp 78 which mates with index slots 82 in a collar member 81 borne by the shaft 51 when the tube 12 is in its advanced position. These slots 82 correspond to the several positions of the turret 14 and for each operational movement of the orienting turret, the feed tube is first withdrawn, thus disengaging the pin 80 from the corresponding index slot; then at the completion of the orienting movement, the feed tube is released and the pin is re-inserted into another index slot corresponding with the position. The accuracy of registration of the various related movements is thereby greatly increased as required in the feed of screws of small dimensions.

It may be noted that though the feed tube 12 moves into its feeding position at each position of the orienting turret, it is nevertheless only when the aperture 52 is positioned opposite the escapement member 13 that a screw is released therefrom.

Figure 5A:
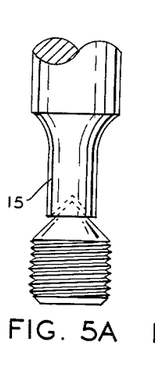
FIGS. 5A and 5B show details of the sensing pin in relation to the two ends of a cone-point socket screw.
Figure 5B:
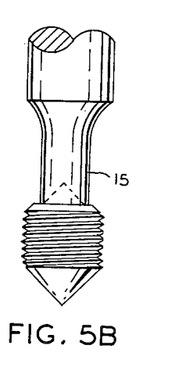

The sensing mechanism comprises the operating linkage hereinbefore described and sensing pin 15. The pin is of such a form that on encountering the end of a screw, it senses a difference in the character thereof, such as a difference in the height or depth of the characteristic socket or point in the end. In the present embodiment, according to FIGS. 5A and 5B, an arrangement is shown whereby the end of pin 15 is recessed for use with cone-pointed socket-headed screws. Now, in the sensing operation, if the pin encounters a point, as in FIG. 5A, the pin is permitted full travel; alternately, if, as in FIG. 5B, it encounters a socket, the pin's travel is stopped causing an electrical contact to be made in switch 44 (FIG. 2). Alternate mechanism and circuits for detection of the recess in socket-screws have been described in the co-pending patent application referred to hereinbefore.

Referring now to FIGS. 1 and 2, the sequence of operations of the above apparatus is established by the foot pedal 30 and the several operations take place in the following order:

It should be assumed initially that the hopper 10 is in constant rotation whereby individual screws drop into feed tube 12 in random end-to-end orientation. Furthermore, in considering in detail the response of the mechanism to the sequence of control impulses, two cases must be distinguished depending on the state in which the mechanism has been left by the operations required on the screw preceding the one being considered. First, therefore, let us assume that the previous screw was in the position of the socket up, that is, in the orientation desired for use with the screw driver.

Under these conditions, the apparatus (FIG. 2), as found, is with solenoids 70 and 71 unenergized, that is, with rack 57 resting on stop 64 whereby the aperture 52 is opposite the sensing pin 15. Solenoid 72 is energized whereby the feed tube 12 and the locking pin 80 are in the retracted position. Solenoid 73 is also energized whereby the gate 58 is in the open position since, as assumed, a screw, found with socket up, has just been ejected into exit tube 16 impelled by an air stream from open valve 18 through tube 19. Now, as the foot pedal 30 is depressed, (I) The initial movement of the pedal releases switch 35 and opens the circuit from the power line to contacts 96 and 97 of an instantaneous action double-pole, double-throw set of contacts of relay 95. Under the initial assumptions, the relay 95 was found locked in an energized state through contacts 96 but with this path now open the relay releases instantaneously and contacts 98 are opened thereby de-energizing solenoids 18 and 73, closing gate 58 and cutting off the air supply in tube 19;

(II) The arm 38 passes the tripper 39 without affecting the sensing pin 15, in accordance with the linkage mechanism hereinbefore described;

(III) Switch 36 is next operated by arm 33 and the normally open contacts are closed, closing the circuit to solenoid 70 thereby fully retracting the rack 57 and turning the orienting turret so that aperture 52 is in a position opposite the end of feed tube 12.

(IV) Now, the normally closed contacts of switch 37 are opened by arm 34 thereby breaking the circuit to solenoid 72 and releasing the feed tube 12 to allow it to move to the loading position juxtaposed to the receiving aperture 52 of the turret. Mechanical means, to be more fully described hereinafter, are provided to release the gate member 13 and to deflect the gate 58 to allow a single screw from the feed tube to drop into the turret aperture. Meanwhile, the movement of the feed tube 12 has inserted the locking pin 80 into an indexing hole in the turret shaft and has thereby assured exact registration of the mating parts.

The foot pedal 30 is now fully depressed and arms 33, 34 and 38 are at their lowermost position. The foot pedal is now released and, as the pedal and arms 33, 34 and 38 move upward, (V) The normally closed contacts of switch 37 are re-closed, energizing solenoid 72 and thereby retracting feed tube 12 and locking pin 80. The normally closed contacts of this switch also supply power to contacts 86 and 88 of relay 85 but since these contacts are open, under the assumed conditions, no effect is produced at this point.

(VI) The normally open contacts of switch 36, held closed since operation (III) above, now reopen whereby solenoid 70 is de-energized and rack 57 is permitted to fall to a position determined by stop 64 rotating the turret 14 and the receiving aperture 52, now bearing a screw in undetermined orientation, in a clockwise direction (looking from the pinion end of the shaft) to a position opposite the sensing pin 15.

(VII) The trip arm 38 now re-engages the trip member 39, and, because in this direction of movement the yielding joint becomes a rigid lever system, the trip member 39 pivots about point 40, moving switch 44 and sensing pin 15 downward to bring the sensing pin in position to determine, in this embodiment, the presence or absence of the cone-pointed end of the screw under examination. The first motion of this switch assembly effects the operation of the subsidiary switch 46 thereby opening normally closed contacts and de-energizing the solenoid 72 allowing the feed tube 12 to move forward and insert the locking pin 80 into the appropriate index slot 82 in the turret shaft. Thus, exact registration of the independent parts is again secured. Since the gate 13 is closed when the end of the feed tube abuts on the turret in this operation, feeding of screws is prevented.

Since the succeeding events in the cycle depend on the finding of the sensing member as it makes contact in this downward travel with the screw in the turret chamber 52, two cases must now be considered: (A) the case in which the screw being examined has its socket "up," and (B) the case in which the screw is found with its cone-point "up." In either case, it will be recalled that it is assumed that all screws will leave the turret with the socket "up." Considering then, first, the situation (A), the cycle proceeds as follows:

(VIII-A) The descending recessed sensing pin 15 encounters the outer rim of the screw (see FIG. 5B) interfering with the full travel of the pin and thus reacting to close normally-open contacts of switch 44 energizing relay 95, thereby closing normally-open contacts 96 and forming a lock-in circuit with the normally-closed contacts of switch 35. Normally-closed contacts 97 are correspondingly opened producing, in this case, no effects. Normally-open contacts 98, close after a delay, interposed by well-known means in the relay, so that the sensing pin may first be withdrawn before solenoid 73 is energized opening gate 58. At the same time the air valve 18 is opened allowing a blast of air from the tube 19 to eject the screw from the turret and through the exit tube 16 into the screw-driver screw-holder 20.

(IX-A) As the end of the cycle is approached, a slight delay is interposed through proper shaping of the tripping member 39, before members 38 and 39 disengage to retract the sensing pin. In this time, arm 33 operates switch 35 reclosing its contacts providing an alternate power source for relay 95 through contacts 96 thus locking it in its operated state.

(X-A) With the relay 95 locked, the arm 38 releases the tripping member 39 and the sensing mechanism is retracted. In so doing, first, the contacts of switch 44 are reopened with no effect on relay 95 because of operation (IX-A) above. Finally, switch 46 is released thus closing the circuit to solenoid 72 whereby the feed-tube 12 is retracted and the turret is unlocked.

Returning to operation (VII), now let us assume the alternate condition, that is, that the sensing operation finds a cone-point "up" in the screw being examined.

(VIII-B) In this case, the recessed sensing pin 15 conforms to the cone-point (see FIG. 5A) and the pin makes its full travel. The switch 44 is not operated and, hence, relay 95 remains unoperated.

(IX-B) As explained in (IX-A) above, the switch 35 is reclosed by upward moving arm 33 and a circuit is established through normally-closed contacts 97 of relay 95 to energize relay 85. This relay includes two sets of contacts 86 and 88, one pair (86) of which close instantaneously and the other pair (88) close after a time delay, interposed by well-known means in the relay, thereby allowing recovery of the sensing mechanism before contacts 88 close. The instantaneous contacts 86 form a path, alternate to the path through switch 37, for the power supply to reach the switch 46 which controls solenoid 72 but which is at the moment open. The purpose of this arrangement will become clear as the description proceeds. The action of the delayed contacts 88 will be found in the next operation (X-B).

(X-B) The final operation of the cycle-establishing means is, as before, to release the sensing mechanism allowing it to retract. In so doing, switch 46 is reclosed and thereby completes the circuit to solenoid 72. The feed-tube 12 and the turret lock-pin 80 is retracted. As this action takes place, the time delay effect referred to in operation (IX-B) above in connection with contacts 88 of relay 85 has transpired and the circuit is completed to solenoid 71. This causes the withdrawal of stop 64 and allows rack 57 to fall, thereby causing rotation of the turret with the screw held therein through 180°. Meanwhile, a second path from close contacts 97 of relay 95 through normally closed contacts of switch 36 has energized relay 90. This relay is provided for delayed action in closing the pair of contacts 93. This time delay is adjusted so as to be completed on the completion of the 180° rotary movement of the turret. The final action is therefore the energization through contacts 93 of the air valve 18 and the solenoid 73 which opens the gate 58 and ejects the screw, cone-point downward, from the now-inverted turret holder with additional acceleration provided by the air jet from the tube 19.

By the initial assumptions, the series of operations so far described depended on finding the apparatus as left by a screw found with socket "up." It will be apparent in the operation last-described, in which a screw with cone-point "up" has been treated, that there are differences in the state of several of the components from the initial state considered which must be accounted for in accommodating this machine to any end-to-end orientation of screws. Following, therefore, a next cycle after (X-B) above:

First, it may be recalled that the apparatus is found with solenoid 70 un-energized and the rack resting on the pedestal 65; correspondingly the turret aperture 52 is inverted and opposite to the entrance of the exit tube 16. Solenoids 71, 72 and 73 are energized, stop 64 is retracted, the feed tube 12 is withdrawn, and the gate 58 in the turret is open.

(I-A) The first downward movement of the pedal 30 opens the normally closed contacts of switch 35. Power remains in this circuit, however, by reason of the normally closed contacts of switch 37 so that there is no immediate effect.

(II-A) The arm 38 passes the tripping mechanism 39 without moving the sensing switch assembly.

(III-A) Switch 36 is actuated by arm 33 opening normally-closed contacts controlling relay 90 de-energizing solenoids 73 and 90 and solenoid valve 18, thereby closing the gate 58 and air supply from the tube 19. Closing the normally-open contacts of switch 37 actuates solenoid 70 which pulls up the rack 57 and rotates the turret to the receiving position.

(IV-A) Switch 37 is now actuated by downward movement of the arm 34, opening its normally-closed contacts. This action de-energizes two circuits one of which includes the solenoid 72 thereby releasing the feed tube 12 and the locking pin 80 to move to their normal positions, the former to the position against the turret aperture 52 and the latter to the position to engage the index slot 82 corresponding to the feed position. In this position, the gate 58 is mechanically deflected sufficiently to allow free access to the turret aperture and gate 13 lifts whereby to allow a screw to feed into the aperture. The second circuit provides an alternate path for the power supply for relay 85 and since now both paths are open, the relay becomes de-energized, opening contacts 86 and 88. The opening of contacts 86 opens the lock-in circuit to the relay coil and the opening of contacts 88 breaks the circuit to solenoid 71 releasing the stop 64 which then takes its normal position juxtaposed to the end of the now-retracted rack member 57.

At this point in the cycle of operations, the foot-pedal has reached the end of its downward motion and, on release, returns upward causing the following operations:

(V–A) Switch 37 recloses energizing solenoid 72, thus retracting feed tube 12 and the locking pin 80.

(VI–A) Switch 36 operates opening the circuit to solenoid 70 which thereby permits the rack 57 to fall to the stop 64, and thus positions the turret aperture opposite the sensing pin. At the same time, the circuit to relay 90 through the switch 36 is closed, reconnecting relay 90 for operation under control of relay 95 at a later stage of operations.

(VII–A) The trip member 39 now re-engages the trip arm 38 and the sensing operation and remaining operation dependent thereupon proceed.

These subsequent operations depend on the findings of the sensing pin and have been described hereinbefore in connection with operations (VIII–A) or (VIII–B) and those following thereafter. It is clear, therefore, that provision is made for feeding screws from a heterogeneous unoriented supply to a utilization device in a uniformly oriented stream.

FIGS. 6, 7, 8 and 9 show in greater detail an apparatus comprising a screw-driving machine and one form of mechanism embodying the principles of my invention for orienting and feeding screws to said machine. In discussing these figures, reference will be made to the schematic diagrams of, particularly, FIGS. 1 and 2 to identify the operations of the elementary parts shown therein as they might appear in an embodiment of the device such as that illustrated in FIGS. 6 to 9. It will be apparent that differences in detail between this embodiment and the more schematic showing in FIGS. 1 and 2, do not constitute differences in the principle of operation of my invention.

Figure 6:
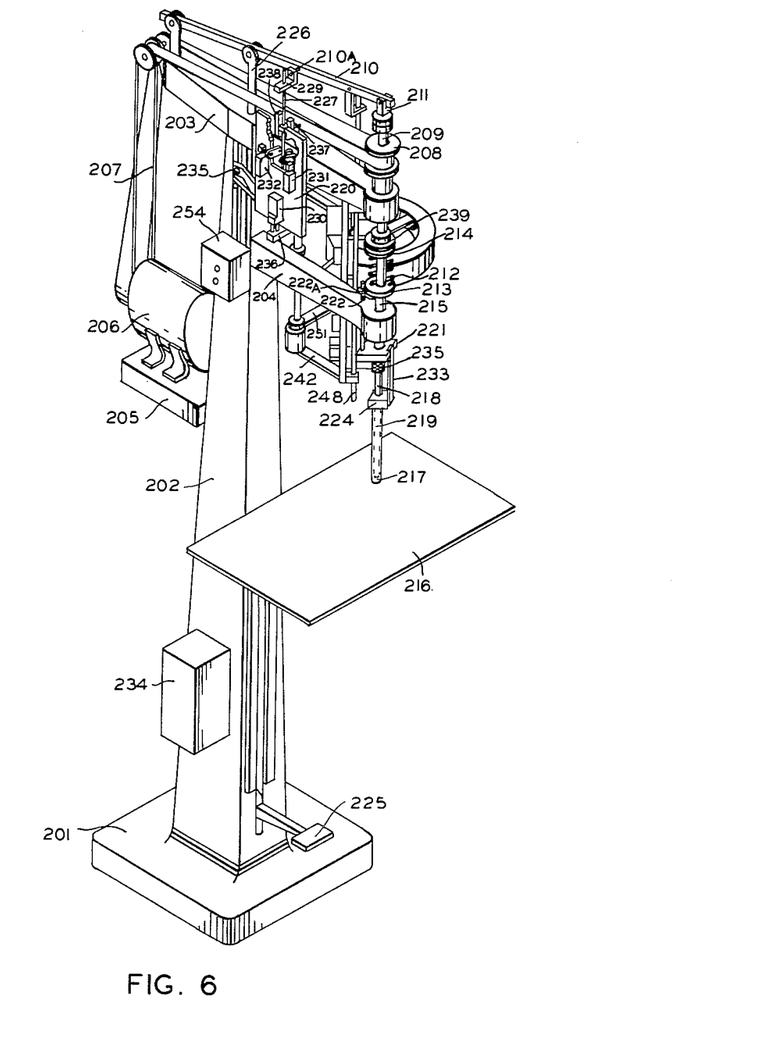
FIG. 6 shows a side view, in perspective, of a more detailed embodiment of the principles of my invention applied to an automatic screw-driver apparatus of conventional design.

Referring to FIG. 6, the apparatus is supported on a unitary supporting frame consisting of a base 201, a supporting column 202, cantilever arm 203 and 204, and motor base 205. The screw-driver mechanism to be described is powered by an electric motor 206 connected through belt 207 to driving pulley 208 which is splined to drive shaft 209 so that said shaft, though constantly rotating, may be at the same time moved vertically with respect to said pulley. The drive shaft 209 is effectively suspended from operating beam 210 by means of a yoke 211 adapted to form a support and a suspension bearing for the rotating shaft in any well-known or conventional manner. The operating beam 210 is pivoted at one end and connected to vertical rod 226 extending downward to the base of the mechanism where it is connected to foot treadle 225. Movement of this treadle is thus communicated to beam 210 and causes corresponding vertical movement of shaft 209. Springs (not shown) acting on vertical shaft 226 tend to return this shaft, the shaft 209 and the foot treadle 225 to a normally raised position.

Shaft 209 consists of an upper section driven by pulley 208 and a lower section or spindle 215 operated through a friction clutch mechanism of conventional design. At the lower end of spindle 215 is attached a wrench 218 or other appropriate screw-driving tool, having a driving bit 223. At the lower end of said wrench 218 and surrounding it (FIG. 7) is a hollow finger 219 having a flange 224, in which said wrench is journaled. Flange 224 is connected by a bar 233 with a plate 221 through which the spindle 215 passes and from which a guide rod 222 extends upwardly through a hole in the arm 204, thereby preventing rotation of said plate 221 and finger 219 connected thereto. When shaft 209 is in its raised position, plate 221 rests upon a flange or hub 235 of the spindle 215 and plate 221 and finger 219 may move downwardly with said spindle, until further downward movement of said plate and finger is prevented by engagement of stop lug 222A on the rod 222 with the upper surface of the arm 204, without, however, interfering with further downward movement of the spindle 215 and wrench 218. During subsequent upward movement of spindle 215, the hub 235 thereof engages the plate 221 and returns the finger 219 and stop lug 222A to their raised position. Conveniently, the wrench 218 may be attached to the spindle 215 by suitably securing the upper end of said wrench into an opening in the aforementioned hub 235. The stop lug 222A is adjustably set on the rod 222 to limit downward motion of said rod and attached parts to the point at which the end of said finger 219 is juxtaposed to the screw hole in a workpiece (not shown) resting on platform 216. A screw holder 217 incorporated in the end of this finger is adapted to hold a screw 317 in readiness to be driven in said workpiece. Electrical power is supplied to the machine through tumber switch 254.

The clutch mechanism connecting the shaft 209 and spindle 215 comprises a friction disc 214 slidable on the spindle 215 and splined thereto, and a friction disc 239 secured to the shaft 209 and engageable by the disc 214. A spring 212, interposed said disc 214 and a flange 213 on the spindle 215, urges the disc 214 into engagement with disc 239 with a pressure which varies with the extent of compression of the spring.

In operation, the motor 206 drives shaft 209 at a constant rotational speed. In the raised position of said shaft, the disc 214 engages disc 239 with only a light pressure, with resultant slight drag tending to cause a slow rotation of the lower spindle 215. As the foot treadle 225 is depressed, the whole shaft assembly, including spindle 215 and finger 219, moves downward, and, when the stop 222A contacts the support 204 the finger 219 stops, the stop 222A having been pre-set so that the screw holder 217 at the lower end of the finger 219 will now be positioned adjacent to a hole in the workpiece prepared to receive a screw. The motion of the spindle, however, continues until the terminating wrench member 223, which is rotating slowly, engages the socket of a screw held by the screw holder 217, pressing it out of the holder into the threaded hole of the workpiece. This engagement increases the pressure of the disc 214 against the disc 239 and compresses the clutch spring 212, whereby more rapid rotation is imparted to the spindle and attached wrench, thereby quickly driving home the screw.

It may be stated that the apparatus and its operation thus far described in connection with FIG. 6 are entirely conventional, being described herein as typical of a class of machine to which my invention may be applied, and no invention is hereby claimed for it.

Figure 10:
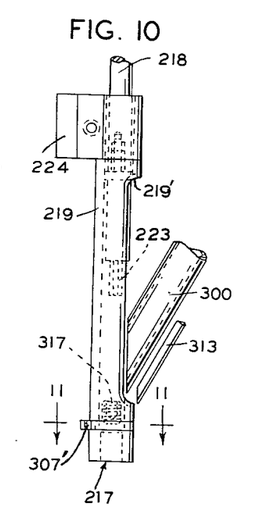
FIG. 10 is a fragmentary view of the screw driving mechanism of FIGS. 6 and 7.

As shown in FIG. 10, the finger 219 is provided with a longitudinal slot 219' along one of its sides, discharge tube 300 having one of its ends juxtapositioned into slot 219' and its other end juxtapositioned to the turret 270 to receive oriented screws from the turret and pass the screws to the finger 219, the length of the slot 219' being slightly longer than the vertical movement of the finger 219 so as not to interfere with the vertical travel thereof. An air tube 313 connected to an air supply has its open end adjacent to the slot 219' to direct a stream of air into the slot as more clearly described hereinafter.

Figure 11:
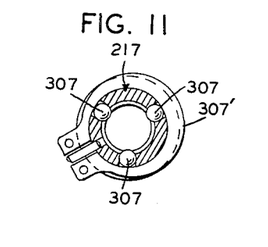
FIG. 11 is a detailed cross sectional view, with parts in elevation, of the screw holding mechanism, taken on line 11 of FIG. 10.

Referring now to FIGS. 10 and 11, the screw holder 217, located at the lower end of the finger 219, is provided with three holes, equally spaced circumferentially in its walls, and slightly conical in shape for retaining three balls 307 in a manner to partly protrude into the base of the holder. A resilient snap ring 307' is fitted around the holder wall and provides spring pressure against the balls 307 so that they normally protrude into the holder base but may be pushed outward against the action of the spring as the screw is pushed downwardly between them.

Figures 7, 8:
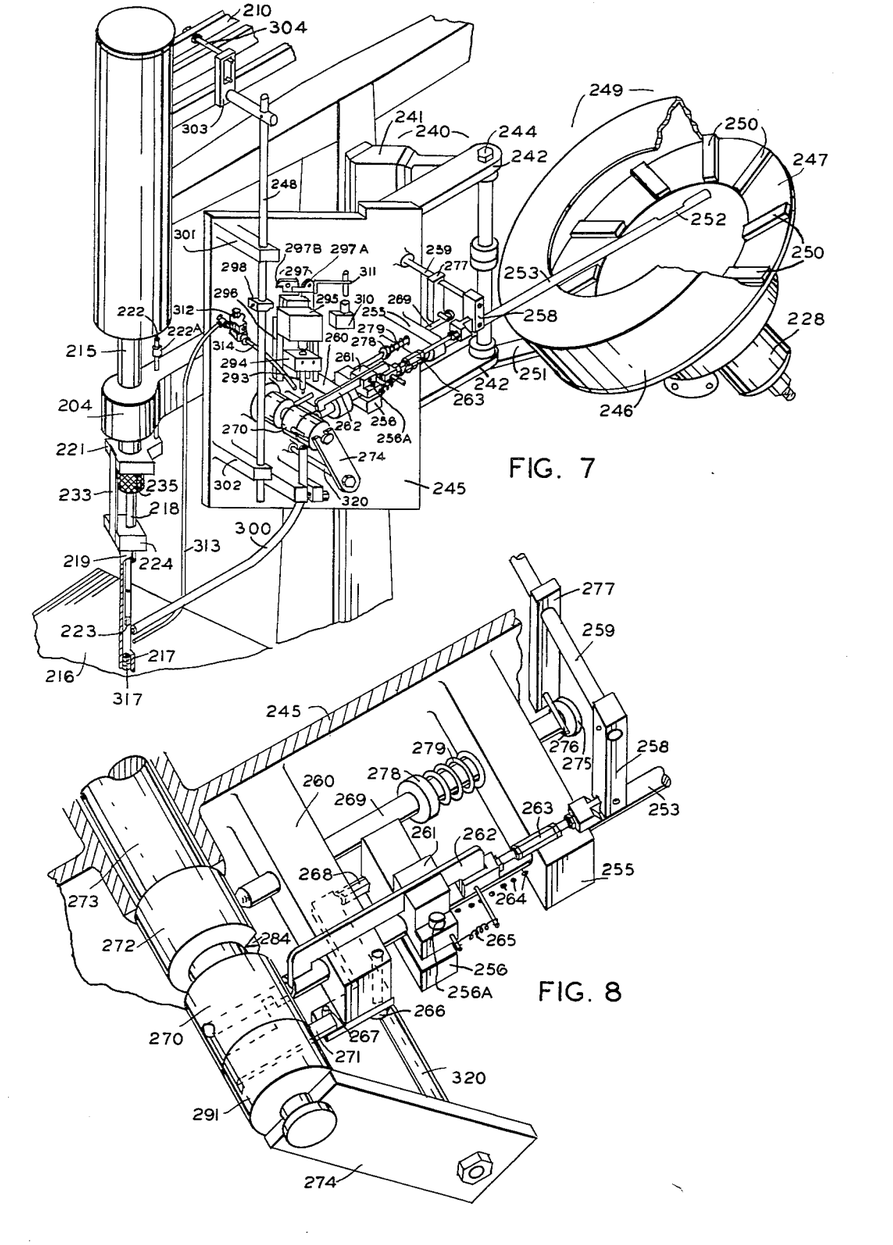
FIG. 7 shows in further detail the embodiment of FIG. 6 viewed from the right side.
FIG. 8 shows certain details of the feeding and orienting mechanism of FIG. 7.

With further reference to FIGS. 6 and 7, there are attached to the beam 210 two operating rods 227 and 243 which together perform functions which may be identified in FIG. 1 by the single rod 31. The former rod (227) is attached to the beam 210 through a right-angle link 229 rotatably fitted to pivot 210A and fixed to said rod. The rod is held vertical by support members (not shown) attached to the back of mounting plate 220 adapted to permit slidable motion in conformity with the motion of said operating beam. On plate 220 are located three trip switches 230, 231 and 232, which may be identified in function with switches 35, 36 and 37, respectively, of FIGS. 1 and 2. The trip switches 231 and 232 are of a class that are operated, as shown in FIG. 6, by cams deflected by contact with trip members 237 and 238. Switch 230, on the other hand, is also of a well-known form in which operation is by raising or lowering a vertical plunger from the bottom as in this case in cooperation with trip member 236 attached to the bottom of the operating rod 227, which, as above noted, extends downwardly in back of the panel 220. Trip members 236, 237 and 238 fixed to operating rod 227 are appropriately disposed on said rod so that engagement is made with switch cams in such sequence related to the motion of the rod that a cycle of events is electrically established in accordance with operations hereinbefore described. Box 234 houses time-delay relays of standard design which corresponds exactly to relays 85, 90 and 95 in FIG. 2.

In FIG. 7 is shown in perspective a right-hand view of the embodiment of FIG. 6 illustrating, in particular, the mounting arrangements and mechanical details for the feeding and orienting mechanism embodying the priciples of my invention.

A hinged bracket 240 consists of a fixed bracket 241 welded or otherwise attached to supporting column 202, a king pin 244, movable arms 242, plate 245, and arm 251. Bracket 240 bears the entire orienting mechanism and the entire mounting plate assembly, 245 and 249, is thereby adaptable to be rotated as a unit out of engagement with the screw-driving machine in a manner to allow access to otherwise not easily accessible operating components for purposes of service or maintenance. The said rotation involves the disengagement of a linkage connecting the screw-driving machine with operating components of the present invention.

The motor and speed-reducer unit 228 driving the feed hopper 249 is supported by arm 251. The hopper itself comprises a partially enveloping fixed cover 246 and a revolving distributor plate 247. Fixed at regular intervals on the plate 247 are radially dispersed, raised flights 250 against the forward edges of which screws may rest in substantially radial alignment. The hopper is tilted at such an angle that a supply of screws placed in the hopper tends to remain in the lower end of the hopper until picked up by the flights 250 as they pass through the mass of supply material.

The operation of the feed apparatus may be described as follows:

A quantity of screws of uniform size but of heterogeneous orientation is loaded into the hopper 249, the distributor plate of which is in constant rotation. Because of the angle at which the unit is mounted, the screws tend to accumulate at the bottom of the hopper, but the radial flights 250 fixed to plate 247 pick up one or more of the screws as the plate 247 rotates. The rotation of the distributor plate brings each flight successively to the top of the hopper opposite to the trough-like end of the feeder tube where the angle is such that they slide off into the trough 252. In falling into the trough, it will be apparent that, of several screws, some may fall into the bottom of the trough and be properly aligned to slide into the feed tube, others may roll off and fall down into the bottom of the hopper to be recycled, and still others may become lodged crosswise of the trough. These latter screws are dislodged by the normal abrupt movements of the feed tube, as the feed tube is moved into and out of engagement with the turret 270, and fall back into the hopper.

Now, referring principally to FIG. 7, and, for further detail, to FIG. 8, mounting plate 245 supported by arms 242 bears the essential elements of the orienting features of my present invention. Feed tube 253 is slidably supported by pillars 255 and 260. Its forward end is slotted to receive gate member 262 (FIG. 8). A bracket 256 which, as shown, may comprise a split block having arms embracing the tube 253 and clamped thereto by a screw (256A) passing through one of said arms and into the other, bears a forked projection 261 which forms a support and pivot for gate arm 262. Thus, this gate member extends parallel to the feed tube and at one end is L-shaped to provide the gate which enters the feed tube and rests on a screw to hold the same until it is to be released. The gate arm is adapted for limited rotary movement under the control of adjustable link 263 to which it is attached at an offset pivot at its outer end, the other end of this link member being pivotally attached to eccentric arm 258. A shaft 259, to which said arm 258 is pinned, transmits motion to said arm and link members from a solenoid actuator 280 mounted on the back of the panel (see FIG. 9). A link 281, pivoted on the solenoid plunger, enables the linear motion of said solenoid to rotate shaft 259 and, hence, the gate member 262 through the linkage system on the front of the panel. It will be observed that counterclockwise movement of shaft 259 deflects the gate 262 and exerts pressure on any screw below its end and since it also engages the slotted end of the feed tube, it will also withdraw the tube from proximity to the turret 270. The clockwise rotation representing the unenergized state of the solenoid is limited to the travel of the solenoid plunger. Hence, on release of this solenoid the linkage system and feed tube moves forward under the force of spring 264 into the feed position. It has been found, however, that to lift the gate member clear of the screw within the tube a small additional force is necessary to take up friction and tolerances of the linkage bearings. This is provided by spring 265 which exerts a force on the gate member at the pivot of link member 263 tending to assure positive opening of the gate when the feed end of the feed tube is in feed position. To be sure, the feed tube may assume this position under conditions other than that in which the aperture of turret 270 is disposed so as to receive a screw (see the hereinbefore discussed operations of the orienting mechanism). In all such cases the end of the feed tube abuts against the turret wall and though the feed gate is open, the screws are retained in the tube.

On the under side of pedestal 260 and pivoted at pin 266 is an L-shaped arm bearing at its outer end a pin 267 which is adapted to engage the turret gate 271. An adjustable pin 268 fixed to the feed tube clamp 256 makes contact with the other arm of this L-shaped member when the feed tube is in its forward, or feed position, and thus, through pin 267, with the turret gate 271 when it, too, is in the feed positon, to deflect the latter sufficiently to permit a screw to enter the receiving aperture. On retraction of the feed tube, the gate 262, clamps the next succeeding screw in the food tube before the tube is actually moved and as it then moves away, the turret gate is released and positively clamps the screw deposited in the aperture.

Journaled in pedestals 255 and 260 for sliding motion parallel to the feed tube 253 is lock-pin 269. A collar 275 on the outer end of this pin member engages a further pin 276 fixed to an arm 277 which is keyed to shaft 259. Thus the locking pin is adapted to move with the feed tube and under constraint of spring 279 tends to move toward the turret whenever the solenoid 280 is unenergized. The forward end of this pin is conically shaped to mate with corresponding slots, such as 284, in the turret shaft and thus assure accurate positioning of the interdependent parts and operations.

The turret 270 itself is described hereinbefore in connection with FIGS. 3 and 4 (corresponding to member 14). It is rotated by shaft 273 which is attached, on the back of the panel (see FIG. 9), to pinion 284 which meshes with rack 286. The solenoid actuator 285 is attached to this rack and thereby converts its linear travel to rotation of the shaft 273 in accordance with the principles described hereinbefore in connection with the schematic diagrams FIGS. 1 and 2. In this embodiment the two positions of the rack member referred to in the last-mentioned description are seen to be determined by lug 290 in combination with stop 291 forming the extreme position and the intermediate stop formed by lug 289 in combination with stop 288. This latter stop is withdrawn by solenoid 287 in its energized state and, when unenergized, the stop is moved in fixed guide member 287A by spring 288A to a position juxtaposed to the lug 289.

Figure 9:
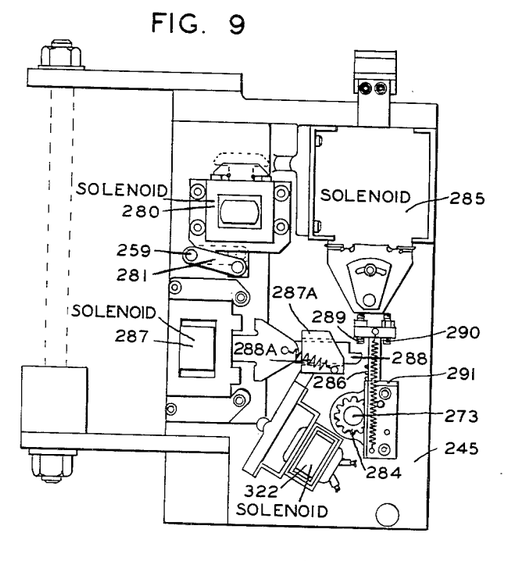
FIG. 9 shows a back view of the mounting plate for the orienting mechanism.

The separable turret section 291 is adapted to be moved by forked link 274 (FIG. 8). This is rigidly attached to shaft 320 which conveys the linear motions of the solenoid 322 mounted on the back side of the panel (FIG. 9).

The sensing mechanism of FIG. 7 consists of sensing pin 293, guided by a hole in block 294 and operatively connected to plunger switch 295 attached to and adapted to slide with base plate 296. This plate is attached to a broken link 297, the right half, 297A, of which is fixed to the base plate 296, and the left-hand half 297B is pivotally attached to mounting plate 245, forming a dog member rotatable when engaged by finger 298 on shaft 248. On engagement of the finger 298 with said dog member when shaft 248 is moved in a downward direction, the dog rotates in a counterclockwise manner allowing the finger to pass the dog member. On the upward excursion of rod 248, the passage of finger 298 past member 297B causes the two halves of said member to mate and, through sliding contact between section 297B and section 297A, as 297B is deflected by the ascent of finger 298, forces section 297A and the switch mounting, together with switch and sensing pin 293, downward. A spring (not shown) returns these parts to a normal position after finger 298 has passed. Operating rod 248 is slidably guided by supports 301 and 302 and is attached to operating beam 210 through a detachable linkage member 303 slidably engaging pin 304.

The subsidiary switch 310 is plunger operated by the operating arm 311 which moves with the sliding base plate 296. In the present embodiment its operation is arranged to take place immediately after the tripping mechanism makes engagement and to return to normal just before the sensing operation is completed.

As has been previously stated, the operating rods 227 and 248 of FIG. 6 perform functions accomplished by the rod 31 in FIG. 1; the three trip switches 230, 231 and 232 of FIG. 6 correspond with switches 35, 36 and 37 of FIGS. 1 and 2, while the time relays 85, 90 and 95 of FIG. 2 are housing in the box 234 in FIG. 6. It will further be apparent that the other elements illustrated in FIGS. 1-5 correspond to parts in the mechanism shown in FIGS. 6 to 9. For instance, the feed tube 253 of FIGS. 6 and 7 performs the functions of tube 12 of FIG. 1; orienting head 14 in FIGS. 1-4 becomes member 270 in FIGS. 7 and 8; the solenoids 280, 285, 287 and 322 in FIG. 9 correspond resepectively to solenoids 72, 70, 71 and 73 of FIG. 2; the sensing finger 293, switch 295, dog-link 297B, and trip finger 298 in FIG. 7 correspond respectively to sensing finger 15, switch 44, dog-link 39, and trip finger 38 in FIGS. 1 and 2; and the discharge tube 300 and screw-receiving finger 219 of FIGS. 7 and 10, correspond respectively to the elements designated 16 and 17 in FIGS. 1 and 2.

The air jets provided by tubes 19 and 22 and valve 18 in FIG. 2 occur in FIG. 7 as tubes 314 and 313 and solenoid valve 312. Tube 314 directs a stream of air into the screw-receiving aperture of turret 270 under control of solenoid valve 312 by which when the gate 271 is fully open the screw is urged rapidly into the tube 300 and through the tube into the finger 219. Once in the finger 219, the screw is then rapidly urged by air from tube 313 into engagement with the holder 217.

The feeding and orienting operations of my invention having thus been fully explained in connection with the schematic views appearing in FIGS. 1 and 2, and the parts shown in those views being readily identifiable with the corresponding parts in the detailed mechanisms illustrated in FIGS. 6–9, further description of the operation is unnecessary.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Orienting apparatus for objects which are distinguishable by a predominant characteristic in one end, comprising a feeder tube bearing said objects in random orientation, rotatable receptacle means adapted to receive said objects one by one and expose one end of each of same to inspection, a first gate member pivoted on said feeder tube adaptable for controllably retaining said objects in said feeder tube, a second gate member in said receptacle means, means on said second gate member for engaging and for controllably retaining said objects during inspection and orientation, means on said feeder tube for positioning said second gate member and said retaining means to receive and engage said objects, orientation-sensing means responsive to said predominant characteristic at the exposed end of said object, an output tube through which said objects are discharged, and means for effecting a pre-established cycle of operation whereby said receptacle means is successively moved to a first position in operative association with said feeder tube to receive one of said objects from said tube, then to a second position juxtaposed to said orientation-sensing means with which it is thereupon momentarily brought into sensing relation, and, under further selective control of said sensing means, alternatively either said second gate member and said retaining means are opened to release said object to said output tube or said receptacle means is rotated through 180 degrees to release said object into said output tube, and means for propelling said object from said receptacle means through said output tube, said receptacle means comprising a cylindrical member with diametrically drilled hole for receiving the said object, said hole being slotted lengthwise, a separable member concentric with said cylindrical member, a slot in said separable member juxtapositioned to said slotted hole in said cylindrical member, said second gate member being pivotally connected adjacent one of its ends in said slot in said separable member and reciprocable at its other end in said slot and adapted to be inserted into or withdrawn from said slotted hole in said cylindrical member, first motor means to operate said separable member, rack and pinion means to rotate said receptacle means, second motor means operatively associated with said rack and pinion means, a stop member determining a position of said rack and pinion means intermediate between fully withdrawn and fully extended position of said second motor means, and means for positioning said stop member.

2. Orienting apparatus as set forth in claim 1, in which said orientation-sensing means comprises a depressed member responsive to said object having a characteristic raised area in one end.

3. Orienting apparatus for objects having ends distinguishable from each other by a characteristic extending longitudinally of one end, said apparatus comprising a supply hopper for said objects, a feed tube for conveying a plurality of said objects from said hopper in random orientation, means for receiving said objects in succession from said tube and exposing an end of each of said objects, means for retaining said objects in said receiving means, means for inspecting the exposed end of each of said objects, means for shifting said receiving means into position for receiving an object from said tube, means for moving said tube to deliver an object to said receiving means, means for subsequently shifting said receiving means into position for presenting the exposed end of said object to said inspecting means, discharge means for the passage of said objects from said receiving means, means for releasing properly oriented objects from said receiving means to said discharge means, means controlled by said inspecting means in response to the presence of an improperly oriented object in said receiving means for shifting said receiving means including said object into properly oriented position prior to discharge of said object therefrom, means for propelling said properly oriented objects from said receiving means through said discharge means, said means for moving said tube including gate means pivotally connected to said tube for preventing the passage of an object therefrom when said tube is withdrawn and for permitting the passage of an object from said tube when said tube is moved to deliver an object to said receiving means whereby said means for moving said tube first closes said gate prior to withdrawing said tube.

References Cited by the Examiner

UNITED STATES PATENTS

| | | | |
|---|---|---|---|
| 233,095 | 10/80 | Hill | 221—278 X |
| 480,530 | 8/92 | Tobey | 144—32 |
| 699,565 | 5/02 | Pugh | 221—173 X |
| 1,340,432 | 5/20 | Benjamin | 221—171 X |
| 1,624,189 | 4/27 | Steen | 144—32 |
| 2,264,105 | 11/41 | White | 221—156 |
| 2,377,154 | 5/45 | Hurley | 193—43 |
| 2,433,096 | 12/47 | Davis | 207—72 |
| 2,534,140 | 12/50 | Moore | 221—278 X |
| 2,630,221 | 3/53 | Stewart | 221—158 |
| 2,638,945 | 5/53 | Austin | 144—32 |
| 2,706,504 | 4/55 | Moore | 144—32 |
| 2,738,899 | 3/56 | Hansen et al. | 221—278 X |
| 2,806,494 | 9/57 | Kull | 144—32 |
| 2,810,248 | 10/57 | Dimond | 221—173 X |
| 2,820,966 | 1/58 | McIlvin | 144—32 X |
| 2,840,126 | 6/58 | Schmitt | 144—32 |
| 2,845,164 | 7/58 | Stahl | 221—173 X |
| 2,961,080 | 11/60 | Smith | 193—43 |
| 2,997,202 | 8/61 | Madeux | 221—9 |
| 3,015,413 | 1/62 | Hengel | 221—9 |

FOREIGN PATENTS

| | | |
|---|---|---|
| 763,816 | 2/57 | Great Britain. |

RAPHAEL M. LUPO, *Primary Examiner.*

KENNETH N. LEIMER, MORRIS M. FITZ, WALTER A. SCHEEL, LOUIS J. DEMBO, *Examiners.*